Aug. 30, 1932.　　T. C. WETMORE　　1,874,677
LEATHER MEASURING GAUGE
Filed March 5, 1929
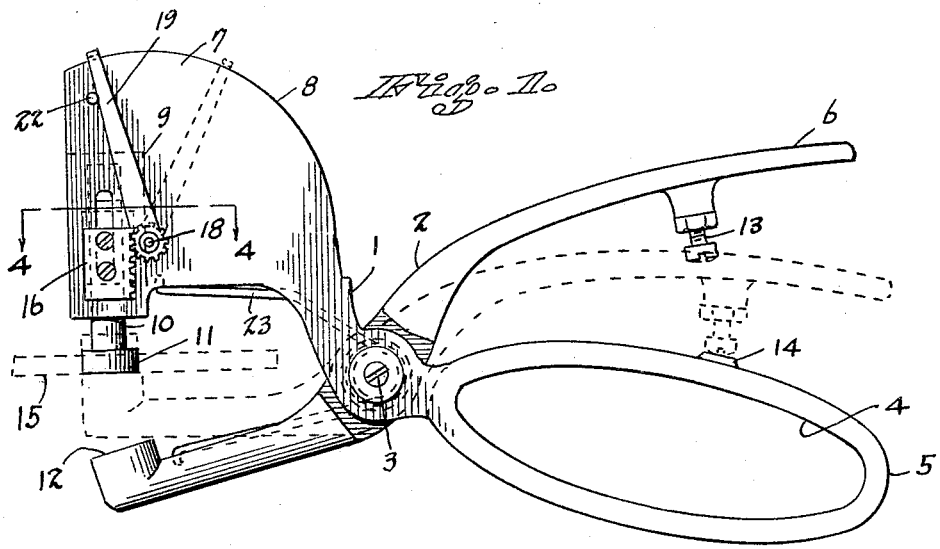
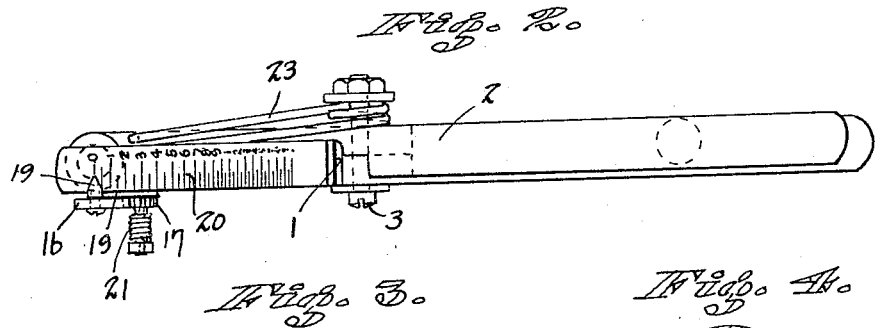
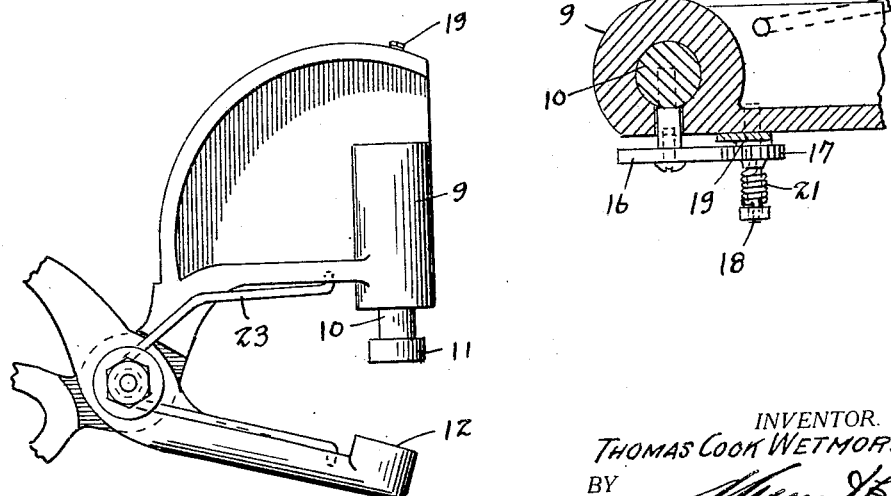
INVENTOR.
THOMAS COOK WETMORE
BY
ATTORNEYS.

Patented Aug. 30, 1932

1,874,677

UNITED STATES PATENT OFFICE

THOMAS COOK WETMORE, OF NAPA, CALIFORNIA, ASSIGNOR TO SAWYER TANNING COMPANY, OF NAPA, CALIFORNIA

LEATHER MEASURING GAUGE

Application filed March 5, 1929. Serial No. 344,486.

My invention relates to improvements in leather measuring gauges, and it consists in the combinations, constructions and arrangements hereinafter described and claimed.

An object of my invention is to provide a leather measuring gauge which is extremely simple in construction and which operates in much the same manner as a pair of pliers except that one of the jaws carries a movable member that is moved when a piece of leather is placed between the jaws, this movement being in direct ratio to the thickness of the leather. A pointer and scale are carried by the jaw supporting the movable member and the pointer is moved over the scale and indicates the thickness of the leather.

Other objects and advantages will appear as the specification proceeds, and the novel features will be particularly pointed out in the appended claims.

My invention is illustrated in the accompanying drawing, in which

Figure 1 is a side elevation of the device;

Figure 2 is a top plan view;

Figure 3 shows a portion of the opposite side of the device shown in Figure 1; and Figure 4 is a section along the line 4—4 of Figure 1.

In carrying out my invention, I provide two members 1 and 2 that are hinged together at 3. The member 1 has an elongated opening 4 in its handle portion 5 for receiving the fingers of the operator's hand, while the member 2 has a handle portion 6.

The member 1 has a head 7 provided with an arcuate-shaped portion 8 and a cylindrical portion 9 (see Figure 4). Within this cylinder I mount a piston 10. The lower end of the piston carries a head 11 that abuts a head 12 of the member 2 when the handles 5 and 6 are moved together. An adjusting screw 13 carried by the handle 6 strikes a boss 14 carried by the handle 5 when the head 12 abuts the head 11. There will therefore, be no movement of the piston 10 unless a piece of leather 15 or other material is placed between the heads 11 and 12.

When a piece of material is placed between the two heads 11 and 12, the head 11 is moved upwardly as indicated by the dotted lines in Figure 1, and this head carries with it the piston 10. A rack 16 is secured to the piston 10 and meshes with a pinion 17. The pinion is rotatably mounted upon a pin 18 and carries a pointer 19. The movement of the rack will swing the pointer over a scale 20 on the curved edge 8. A spring 21 (see Figure 4) will return the pointer back to zero reading and the head 11 into the full-line position. The pointer rests upon a stop 22 when in zero position.

A spring 23 urges the heads 11 and 12 away from each other when the handles 5 and 6 are freed. This permits a strip of material to be placed between the heads and be quickly measured, the measuring being accomplished by bringing the handles 5 and 6 into engagement with each other, and then reading the position of the pointer on the scale.

Although I have shown and described one embodiment of my invention, it is to be understood that the same is susceptible of various changes, and I reserve the right to employ such changes as may come within the scope of the invention as claimed.

I claim:

1. A gauge comprising two members pivotally secured to each other and provided with handle portions, a fixed head carried by one member, a spring-pressed movable head and a scale carried by the other member, a pointer operatively connected to the movable head and movable over the scale, said spring-pressed movable head being urged toward the fixed head to a normal position, and an adjstable stop carried by one of the handles and adapted to contact with the other for preventing further movement of the handles toward one another when the heads abut one another and in the absence of material to be measured being placed therebetween, said movable head actuating said pointer only when a piece of material is placed between the heads, the movement of the pointer ceasing when the adjustable stop member abuts the other handle.

2. A gauge comprising two members pivotally secured to each other and provided with handle portions, a fixed head carried by one member, a spring-pressed movable head and a scale carried by the other member, a pointer operatively connected to the movable head and movable over the scale, said spring-pressed movable head being urged toward the fixed head to a normal position, an adjustable stop carried by one of the handles and adapted to contact with the other for preventing further movement of the handles toward one another when the heads abut one another and in the absence of material to be measured being placed therebetween, said movable head actuating said pointer only when a piece of material is placed between the heads, the movement of the pointer ceasing when the adjustable stop member abuts the other handle, and spring means for returning the movable head to normal position and a second spring means for moving the handles into open position.

3. A measuring gauge comprising a pair of members pivotally secured together, a fixed head carried by one of the members and a spring-pressed movable head mounted on the other and being urged toward the fixed head to a normal position, stop means for preventing the movement of the members toward each other beyond the travel necessary to bring the heads into contacting relation in the absence of material to be measured between the heads, said movable head being displaced relatively to the member by which it is carried when a piece of material is introduced between the heads and the members moved so as to grip the material between the heads and thereby displace the movable head, the movement of the members toward one another being ceased upon the stop means becoming active, and indicating means operated by the movable head for designating the thickness of the material.

4. A measuring gauge comprising a member having a quadrant-shaped portion, a spring-pressed movable head carried by said portion and being urged toward the fixed head to a normal position, a pointer operatively connected to said head and being movable over the quadrant, a second member pivotally secured to the first and fashioned with a head adapted to be brought into confronting relation with the movable head, and stop means for preventing the movement of the members toward each other beyond the travel necessary to bring the heads into contacting relation in the absence of material to be measured between the heads, said pointer being actuated only when material is introduced between the heads and the members moved so as to grip the material between the heads and thereby displace the movable head relative to the member by which it is carried, the movement of the pointer being ceased upon the stop means becoming active.

5. A gauge in the shape of a pair of pliers and comprising two members pivoted together, an indicator carried by one of said members, a movable head carried by the same member for actuating the indicator, a fixed head mounted on the other member, spring means for urging the movable head toward the fixed head to a normal position, spring means for urging the members apart, and a positive stop for preventing movement of the members toward each other beyond the travel necessary to bring the heads into contacting relation when no material to be measured is introduced therebetween, said indicator being actuated when the movable head is displaced relative to the said one member by gripping material between the heads.

THOMAS COOK WETMORE.